(12) United States Patent
Hac

(10) Patent No.: US 6,923,510 B2
(45) Date of Patent: Aug. 2, 2005

(54) CONTROL OF BRAKE-AND STEER-BY-WIRE SYSTEMS DURING BRAKE FAILURE

(75) Inventor: Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/664,759

(22) Filed: Sep. 17, 2003

(65) Prior Publication Data

US 2005/0057095 A1 Mar. 17, 2005

(51) Int. Cl.[7] .................................................. B60T 8/88
(52) U.S. Cl. ........................ 303/122; 303/140; 303/146; 701/48
(58) Field of Search ................................ 303/140, 146, 303/122, 147, 122.01–122.13; 701/74, 77, 70, 72, 73, 80, 71, 43, 48, 41, 78; 180/197, 402

(56) References Cited

U.S. PATENT DOCUMENTS

| | | | |
|---|---|---|---|
| 6,062,657 A | 5/2000 | Dimasi | |
| 6,453,223 B1 | 9/2002 | Kelley | |
| 6,453,226 B1 | 9/2002 | Hac et al. | |
| 6,535,806 B2 | 3/2003 | Millsap et al. | |
| 6,547,343 B1 | 4/2003 | Hac | |
| 6,549,842 B1 | 4/2003 | Hac et al. | |
| 6,554,095 B2 | 4/2003 | Zheng et al. | |
| 6,598,695 B1 | 7/2003 | Menjak et al. | |
| 2002/0109403 A1 * | 8/2002 | Yamamoto et al. | 303/146 |

* cited by examiner

*Primary Examiner*—Douglas C. Butler
(74) *Attorney, Agent, or Firm*—Michael D. Smith

(57) ABSTRACT

A method, computer usable medium including a program, and a system for braking a vehicle during brake failure. The method and computer usable medium include the steps of determining a brake force lost corresponding to a failed brake, and determining a brake force reserve corresponding to at least one non-failed brake. At least one command brake force is determined based on the brake force lost and the brake force reserve. The at least one command brake force is applied to the at least one non-failed brake wherein at least one of an undesired yaw moment and a yaw moment rate of change are limited to predetermined values. The system includes a plurality of brake assemblies wherein a command brake force is applied to at least one non-failed brake.

21 Claims, 9 Drawing Sheets

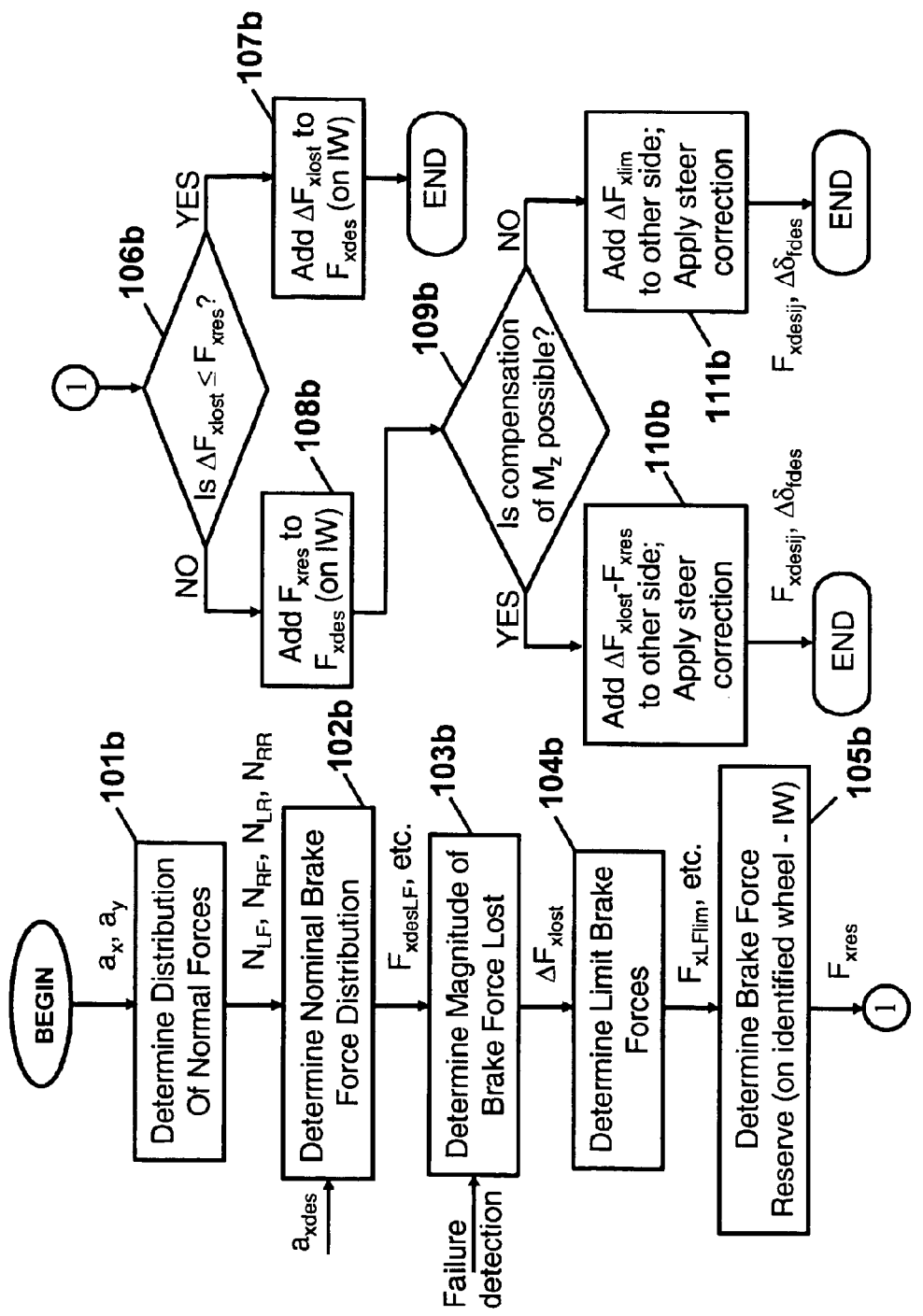

CONTROL OF BRAKE-AND STEER-BY-WIRE SYSTEMS DURING BRAKE FAILURE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract number F33615-01-2-5804 awarded by the U.S. Air Force Research Labs.

TECHNICAL FIELD OF THE INVENTION

The present invention relates generally to steering and brake systems. More particularly, the invention relates to strategies for braking a vehicle during brake failure.

BACKGROUND OF THE INVENTION

Brake-by-wire (BBW) and steer-by-wire (SBW) systems for motor vehicles have reached at least prototype stage of development with some systems being implemented into production vehicles. In BBW systems, braking of each wheel may be controlled by independently operating, usually electromechanical or electro-hydraulic, actuators. Consequently, failure modes that may occur in these systems are different from those experienced in conventional (e.g., hydraulic or pneumatic) brake systems. As BBW systems generally include some level of redundancy in measurements, algorithms have been developed for detection and identification of failure modes.

In SBW systems, steering angle of front (or rear) wheels may be controlled by actuators. In true SBW or Active Rear Steer (ARS) systems, this may be achieved without direct mechanical link to the hand-wheel angle. In Active Front Steer (AFS) systems, a steering correction may be applied to the front wheels in addition to operator steering input. One advantage of these systems is that a corrective term can be applied to the front (or rear) steering angle independently of the vehicle operator.

One strategy for dealing with brake failure, which is consistent with current approach used for conventional (hydraulic) brake systems, is to disable the brake actuator on the opposite side of vehicle. This is usually done at the wheel that is diagonally opposite of the failed brake. This reduces the yaw moment applied to vehicle as a result of side-to-side imbalance in brake forces. However, it also reduces the deceleration rate and increases the stopping distance of the vehicle. As such, it would be desirable to provide a strategy for dealing with brake failure without significantly reducing the deceleration rate and increasing the stopping distance of the vehicle.

Another strategy for dealing with brake failure involves redistributing brake force lost from the failed brake equally to the remaining functioning brake(s). Such a strategy is disclosed in U.S. Pat. No. 6,062,657 issued to Dimasi on May 16, 2000. The Dimasi patent teaches a brake failure compensation system and method for a plurality of vehicle cars (e.g., train cars) articulately connected to one another. One shortcoming of this strategy relates to an inability to properly handle side-to-side imbalances that arise from the yaw moment. The generation of a larger yaw moment pulls vehicle to one direction during brake failure, requiring steering correction to maintain the desired path. In extreme conditions, the vehicle may spin out unless the vehicle operator is able to counter the brake force imbalance by steering quickly in an opposing direction. As such, it would be desirable to provide a strategy for dealing with brake actuator failure while minimizing side-to-side imbalances arising from the yaw moment.

Therefore, it would be desirable to provide a strategy for braking a vehicle during brake failure that overcomes the aforementioned and other disadvantages.

SUMMARY OF THE INVENTION

A first aspect of the present invention provides a method of selectively inhibiting wheel rotation of a vehicle during brake failure. The method includes the steps of determining a brake force lost corresponding to a failed brake, and determining a brake force reserve corresponding to at least one non-failed brake. The method also includes determining at least one command brake force based on the brake force lost and the brake force reserve. The method may also include determining a steering correction and applying the steering correction to counter a yaw moment generated from asymmetric braking based on a predetermined limit.

A second aspect of the invention provides a computer usable medium including a program for selectively inhibiting wheel rotation of a vehicle during brake failure. The computer usable medium includes computer readable program code for determining a brake force lost corresponding to a failed brake, and computer readable program code for determining a brake force reserve corresponding to at least one non-failed brake. The computer usable medium further includes computer readable program code for determining at least one command brake force based on the brake force lost and the brake force reserve, and computer readable program code for applying the at least one command brake force to the at least one non-failed brake wherein at least one of an undesired yaw moment and a yaw moment rate of change are limited to predetermined values. Computer usable program code may be provided for determining and applying a steering correction to counter a yaw moment generated from asymmetric braking based on a predetermined limit.

A third aspect of the invention provides a vehicle brake system. The system includes a plurality of brake assemblies for selectively inhibiting wheel rotation of the vehicle wherein a command brake force is applied to at least one non-failed brake. A controller is operably attached to the brake assemblies. The controller includes means for determining a brake force lost corresponding to a failed brake, and means for determining a brake force reserve corresponding to a non-failed brake. The controller further includes means for determining the command brake force based on the brake force lost and the brake force reserve wherein at least one of an undesired yaw moment and a yaw moment rate of change are limited to a predetermined value. An active steer system may be operably attached to the controller for applying a steering correction.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIGS. 2A and 2B are flow diagrams of two vehicle braking algorithms in accordance with the present invention;

DESCRIPTION OF THE PRESENTLY PREFERRED EMBODIMENTS

Figure 1:
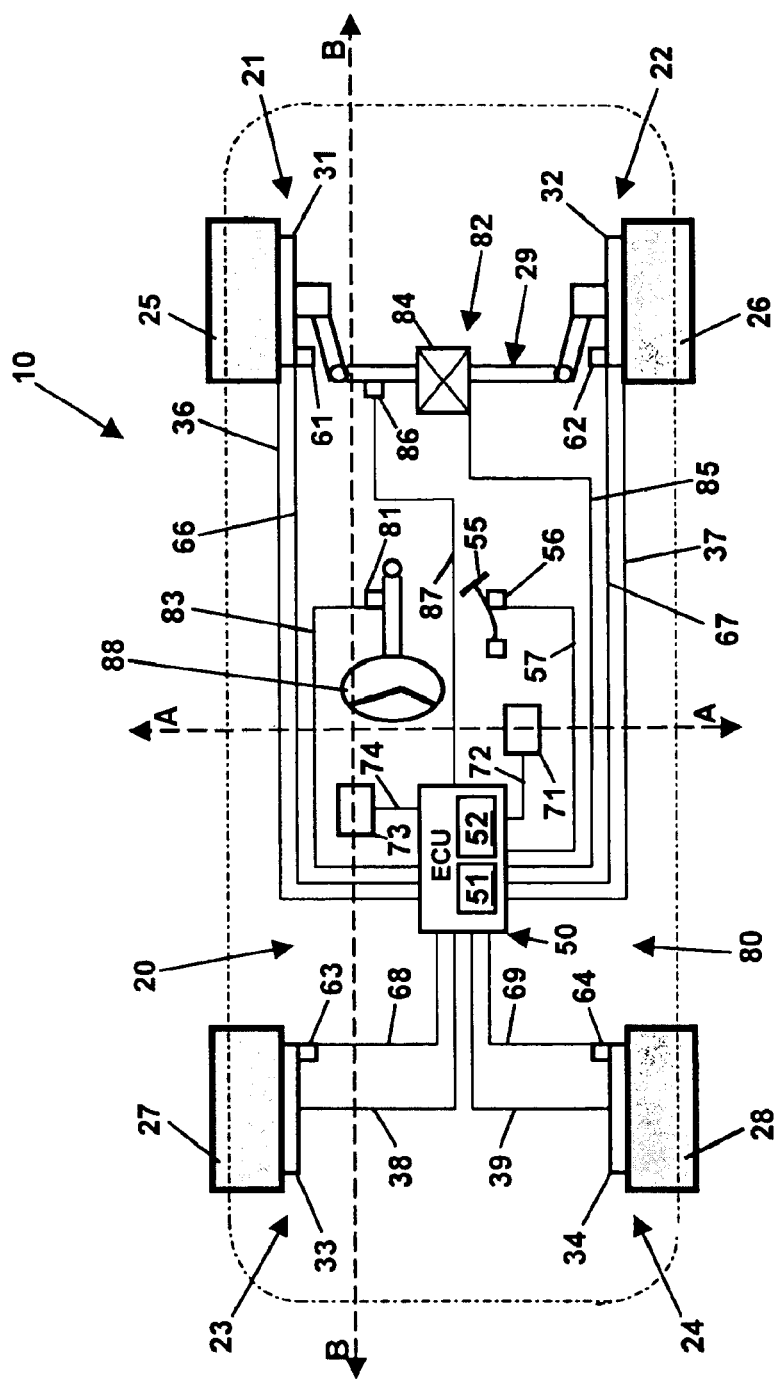
FIG. 1 is a schematic view of a vehicle including a vehicle brake system in accordance with the present invention.

Referring to the drawings, wherein like reference numerals refer to like elements, FIG. 1 is a schematic view of a vehicle, shown generally by numeral 10, with a vehicle brake system 20 in accordance with the present invention. Those skilled in the art will recognize that the vehicle 10 and vehicle brake system 20 may include a number of alternative designs and may be employed in a variety of applications. For example, as will be described, the vehicle 10 may include various sensor(s), active brake-by-wire (BBW) and steer-by-wire (SBW) systems as part of different embodiments of the vehicle brake system 20.

In the present description and figures, the vehicle 10 and vehicle brake system 20 include both a BBW system 80 and a SBW system 82 for selectively inhibiting wheel rotation during brake failure while limiting an undesired yaw moment to an acceptable level. In portions of the following description, the SBW system 82 may be omitted to provide a vehicle including only a BBW system 80.

Vehicle 10 may include four brake assemblies, in this case, a left front (LF) 21, a right front (RF) 22, a left rear (LR) 23, and a right rear (RR) 24 brake assembly. Each brake assembly 21, 22, 23, 24 may include wheels 25, 26, 27, 28 coupled to a suspension (not shown) with the steered wheels further coupled to a steering actuator 84, as for example, via a steer rack 29 or other mechanical linkage.

Brake assemblies 21, 22, 23, 24 may each include braking means, such as a conventional disc brake system 31, 32, 33, 34. The brake systems 31, 32, 33, 34 may each include a disc brake and a hub, which provides a mounting for the wheels 25, 26, 27, 28. The hub may be mounted (e.g., on a suspension link of a vehicle) for rotation about a central axis of the hub. The disc brake may include a disc which is fixedly mounted on the hub for rotation therewith. The brake systems 31, 32, 33, 34 each include a brake actuating device with, for example, friction material pads arranged on opposite sides of a wheel disc. The pads are urged into frictional engagement with the disc to brake the hub and hence the wheels 25, 26, 27, 28.

In one embodiment of the invention, the brake systems 31, 32, 33, 34 may be coupled to an electronic control unit 50 (ECU) by a variety of means known in the art, such as a radio frequency transmission or by coupled wire 36, 37, 38, 39, as shown, to actuate and selectively control braking. The ECU 50 controlled brake systems 31, 32, 33, 34 may optionally provide antilock braking and/or other "advanced" braking functions.

Operation of the brake systems 31, 32, 33, 34 may involve an operator depressing a brake pedal 55 which is sensed by one or more brake pedal force sensor(s) 56 as is known in the art. The force sensor 56 may relay a signal indicative of the brake pedal force to the ECU 50 via a coupled link 57. Subsequently, the ECU 50 may determine an appropriate brake response and relay a signal via the coupled wire 36, 37, 38, 39 for actuating the brake systems 31, 32, 33, 34. Vehicle 10 braking may then be achieved by forcing the pads into frictional engagement with the disc. As such, a braking force is applied at the wheel assembly 21, 22, 23, 24 discs thereby effectively braking the vehicle 10. Electro-motors may be used to bias the pads against the disc to automatically actuate braking at the wheel assemblies 21, 22, 23, 24. Those skilled in the art will recognize that numerous other brake system types and arrangements may be adapted for use with the present invention. For example, the vehicle 10 may include drum brakes, other disc brake system arrangements, and/or a variety of (electro-)hydraulic and (electro-)mechanical brake actuators.

Each wheel assembly 21, 22, 23, 24 may include a wheel speed sensor 61, 62, 63, 64 that provides an output signal, represented by line 66, 67, 68, 69 indicative of the rotational speed of the corresponding wheel 25, 26, 27, 28 at that corner of the vehicle 10. Each wheel speed sensor 61, 62, 63, 64 may further include an internal circuit board with a buffer circuit for buffering the output signal, which may be provided to the ECU 50. Output signals 66, 67, 68, 69 may be relayed to the ECU 50 by a variety of means known in the art, such as a radio frequency transmission or by coupled wire. Suitable wheel speed sensors 61, 62, 63, 64 are known to, and may be constructed by, those skilled in the art. Numerous alternative types of speed, velocity, and acceleration type sensors, including transformer type sensors, may be adapted for use with the present invention.

Vehicle 10 may optionally include one or more lateral acceleration sensor(s) 71 for providing output signals, represented by line 72, indicative of acceleration roughly along axis A. One or more longitudinal acceleration sensor(s) 73 may provide output signals, represented by line 74, indicative of acceleration roughly along axis B. Lateral and longitudinal acceleration sensors 71, 73 may provide their output signals 72, 74 to the ECU 50. Suitable acceleration-type sensors are known to, and may be constructed by, those skilled in the art.

Steer-by-wire (SBW) systems are known to those skilled in the art. Exemplary SBW systems that may be adapted for use with the present invention may include those disclosed by U.S. Pat. No. 6,598,695 issued to Menjak et al. on Jul. 29, 2003 and U.S. Pat. No. 6,535,806 issued to Millsap et al. on Mar. 18, 2003. Mechanical steering systems typically include a mechanical linkage or a mechanical connection between the steering wheel and wheel. Movement of such mechanical systems is often power assisted through the use of hydraulic assists or electric motors. SBW systems, however, to varying extents replace, for example, the mechanical linkage between the steering wheel and the vehicle wheels with an electrically assisted actuator, which may receive controlling input from a controller (e.g., the ECU 50).

In one embodiment, the SBW system 82 may be an active front steer (AFS) system as known to those skilled in the art. The SBW system 82 may include one or more steering angle sensor(s) 81 for measuring a turn angle of a steering wheel 88. Steering angle sensor 81 may provide output signals, represented by line 83, to the ECU 50. One or more steering actuators 84 may receive input signals, represented by line 85, from the ECU 50 for controlling the steering angle of the wheels 25, 26. The input signals 85 may include both vehicle operator steering input from the steering wheel 88 as well as steering input correction(s) provided by the algorithm of the present invention during brake failure. The steering angle of the wheels 25, 26 may be sensed by one or more sensors 86 and the resulting signal, represented by line 87, sent to the ECU 50. Those skilled in the art will recognize that numerous SBW systems may be adapted for use with the present invention including, but not limited to, two- and four-wheel SBW systems. For example, the vehicle may additionally include an active rear steer (ARS) system.

In one embodiment, the ECU 50 may include a digital microprocessor 51 programmed to process a plurality of input signals in a stored algorithm and generate output signals modulating the braking force at the wheel assemblies 21, 22, 23, 24 and, optionally, controlling the SBW system 82. The methods, algorithms, and determinations (e.g., calculations and estimations), of the presently preferred embodiments, including those based on equations or value tables, may be performed by a device such as the microprocessor 51. The computer usable medium and value tables associated with the presently preferred embodiments may be programmed or read into a memory portion 52 (e.g., ROM, RAM, and the like) thereby allowing the microprocessor 51 to execute a brake control algorithm in accordance with the present invention. Furthermore, the values, parameters, and other numerical data may be stored as required in the memory portion 52. Analog signal processing may be provided for some of the input signals. For example, the signals from the acceleration sensors 71, 73, wheel speed sensors 61, 62, 63, 64, brake pedal force sensor(s) 56, and steering angle sensor 86 may be low-pass filtered through analog low-pass filter(s) to reduce signal noise.

Figure 2A:
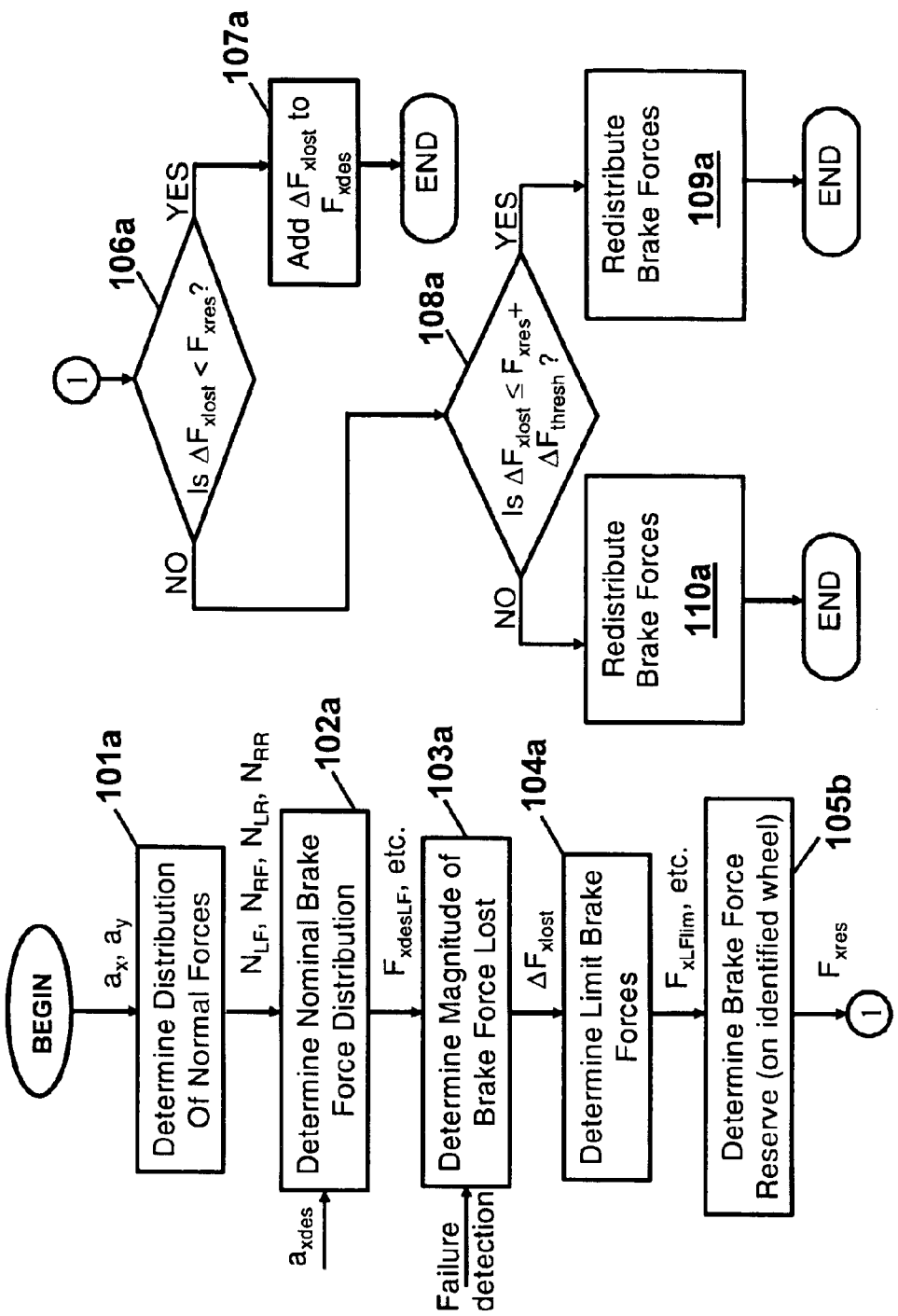

FIGS. 2A and 2B are flow diagrams of two vehicle braking algorithms in accordance with the present invention. The algorithms may be implemented in, for example, the vehicle 10 and brake system 20 of FIG. 1. The vehicle braking algorithms provide a strategy for selectively inhibiting wheel rotation during brake failure while limiting an undesired yaw moment to a predetermined value. For illustrative purposes, the present invention is described in the context of an algorithm for controlling brake actuator failure in a vehicle equipped with a BBW system, FIG. 2A, or both BBW and SBW systems, FIG. 2B. A brake actuator failure may be quickly detected by a supplemental fault-detection algorithm using existing sensors provided with brake systems or by other strategies known in the art. The failed actuator typically does not generate brake torque, that is, it operates in a so-called "fail-silent" mode.

In the present description, brake forces lost during actuator failure are redistributed among remaining actuators and, optionally, the yaw moment may be countered by an automatic steering correction when the vehicle is additionally equipped with a SBW system. Specifically, an algorithm according to the present invention may provide: 1) close following of a total desired brake force/deceleration and 2) limitation of a magnitude of a yaw moment arising due to asymmetric braking and/or its rate of change (e.g., in the case of a vehicle with BBW only) or balance of the yaw moment by steering correction (e.g., in the case of a vehicle with both BBW and SBW). The algorithm may use information from longitudinal and lateral (optional) acceleration sensors and an estimate of surface coefficient of adhesion. Estimation of surface coefficient of adhesion is known to those skilled in art; the estimate of surface coefficient for the entire vehicle (average for all four wheels) is described in U.S. Pat. No. 6,453,223 issued to Kelley, et al. on Sep. 17, 2002 and the estimation of surface coefficient under individual wheels in U.S. Pat. No. 6,549,842 issued to Hac, et al. on Apr. 15, 2003.

Figure 3:
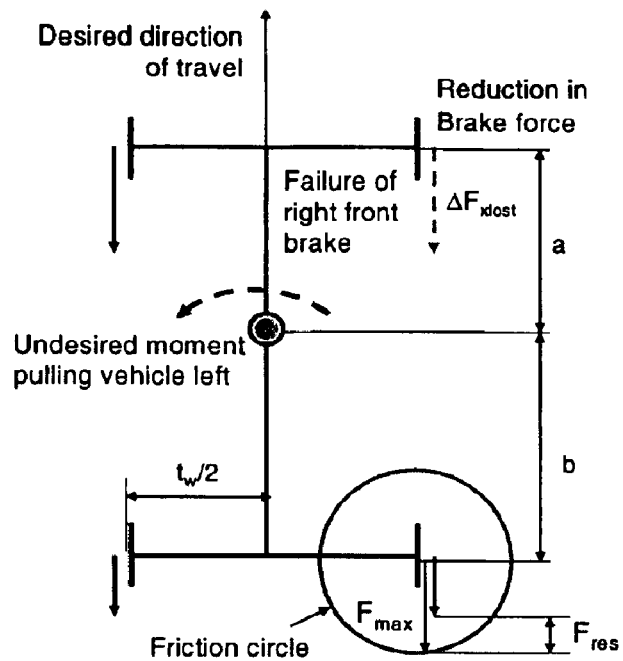
FIG. 3 illustrates brake forces acting on a vehicle with right front brake failure.

FIG. 3 illustrates brake forces acting on a vehicle with right front brake failure. During straight braking, the right front brake actuator may fail and therefore not develop the desired brake force, $F_{xRFdes}$. If no corrective action is taken, the total braking force and vehicle deceleration may be reduced below the desired values; as such, the vehicle may be subjected to the yaw moment $M_z = F_{xLF} * t_w/2$, where $t_w$ is the track width. This yaw moment pulls the vehicle to one direction (e.g., to the left side as shown in the figure), requiring steering correction to maintain the desired path (e.g., in the vehicle forward direction, in this case). In extreme conditions, the vehicle may spin out unless the vehicle operator is able to counter the brake force imbalance by steering quickly in an opposing direction.

For a vehicle with BBW or with BBW and SBW systems, corrective action may be taken automatically after brake failure is detected by an ECU according to the present invention. The ECU may provide a faster response than possible for a vehicle operator. The corrective action may comprise determining a command brake force for each functioning (e.g., non-failed) brake through a process of lost brake force redistribution and then applying the command brake force to the remaining functioning brake(s). If necessary, a corrective steering input that counters the yaw moment resulting from asymmetric braking may be automatically provided if the vehicle is additionally equipped with a SBW system.

Figure 4:
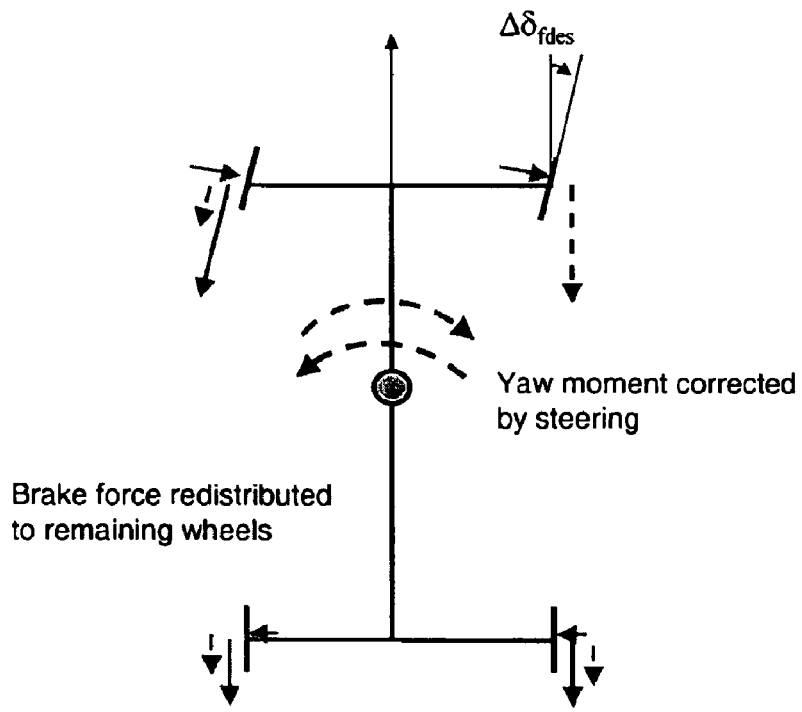
FIG. 4 illustrates forces applied to a vehicle by an electronic control unit (ECU) with right front brake failure.

A combination of appropriate brake force redistribution and steering correction is illustrated in FIG. 4. In most cases of asymmetric braking, there is a conflict between the requirement of keeping vehicle side-to-side brake forces balanced and maintaining the desired total braking force (and vehicle deceleration). In the situation illustrated in FIG. 3, the brake control algorithm may attempt to compensate for the braking force lost due to failure of right front actuator by adding it to the right rear actuator. This is one possible and acceptable solution, during light braking conditions. Under moderate to heavy braking, however, this cannot be fully accomplished because the right rear wheel may be saturated before the desired total brake force is achieved. If a desired deceleration is to be maintained, the remaining brake force may have to be added to the two left wheels. This, however, may increase the imbalance in the brake forces left to right therefore resulting in a yaw moment. One solution to this problem depends on whether the vehicle is additionally equipped with a SBW system.

For a vehicle equipped with a BBW system only (i.e., no SBW system), a braking strategy according to the present invention may involve an initial reduction in brake force imbalance followed by a slow brake imbalance (and yaw moment) build-up, such as within about a second, to provide the vehicle operator sufficient time to react (i.e., by counter-steering). This course of action is analogous to the strategy employed by modern ABS systems on split □ surfaces (i.e., when the road surface has significantly different coefficients of friction on either side of the vehicle). As such, the side-to-side brake force imbalance (e.g., the yaw moment) in split □ surfaces is allowed to increase slowly to reduce stopping distance, while giving the vehicle operator sufficient time to react. This control strategy allows the operator to maintain control without significantly compromising stopping distance.

For a vehicle equipped with both BBW and SBW systems, a braking strategy according to the present invention involves an allowance in the side-to-side brake imbalance, wherein the undesired yaw moment is countered by steering correction. As the steering correction must be limited (i.e., either due to actuator limits or the need to maintain vehicle steerability via operator inputs), a situation may arise wherein the full correction of the yaw moment is not possible (i.e., if maximizing the braking force is a goal). In this case, the side-to-side brake imbalance is not allowed to increase beyond the level of the yaw moment, which may be counterbalanced by automatic steering correction. An underlying principle of this control strategy is to minimize the undesired yaw moment while the desired braking force is followed as closely as possible.

For the purposes of describing the present invention, three examples are considered for vehicles equipped with either BBW or BBW and SBW. The examples depend on intensity of braking relative to surface coefficient of adhesion. Those skilled in the art will appreciate that the term "intensity of braking" is not used to mean any particular desired deceleration level, but rather is related to the relationship between the brake force lost due to failure of actuator, $\Delta F_{xlost}$, and brake force reserve, $F_{xres}$, on the wheel that is on the same side of vehicle as the wheel with failed actuator.

Using a failure of a front right brake actuator as an example, both brake force lost and brake force reserve are illustrated in FIG. 3. Brake force lost, $\Delta F_{xlost}$, is defined as the desired brake force of the failed actuator, which cannot be developed at that wheel because of failure. Brake force reserve, $F_{xres}$, is defined as the difference between the limit brake force, which can be developed at the wheel on the same side as the wheel with failed actuator, $F_{xlim}$, and the desired brake force for that wheel: $F_{xres}=F_{xlim}-F_{des}$. The limit force, $F_{xlim}$, is the largest brake force that can be developed by a given tire without exceeding limit of friction and may be estimated as a product of estimated normal force and estimated surface coefficient of adhesion. The desired brake force is the force that should be developed by each tire during normal operation without failures. The sum of the desired brake forces for all four wheels is the total desired brake force. The command brake force for each wheel is the force that should be developed when brake actuator failure is detected. The command brake force for a wheel with normally operating actuator is a sum of the desired brake force and an additional force necessary to compensate for the brake failure.

Figure 5:
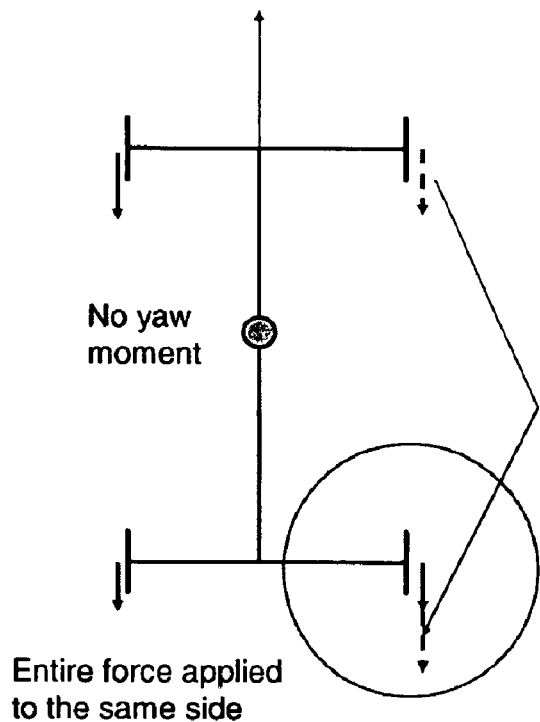
FIG. 5 illustrates redistribution of brake forces during light braking with right front brake failure.

For a vehicle equipped with a BBW system only (e.g., no SBW system), the following three braking examples are provided:

Example #1A—light braking, as illustrated in FIG. 5. In this instance, the brake force lost, $\Delta F_{xlost}$, is smaller than the brake force reserve, $F_{xres}$, so that the entire brake force lost may be added to the desired brake force and the sum applied as one command brake force to the wheel on the same side of vehicle without saturating this wheel. The total brake force (and vehicle deceleration) is maintained, without causing undesirable yaw moment.

Figure 6:
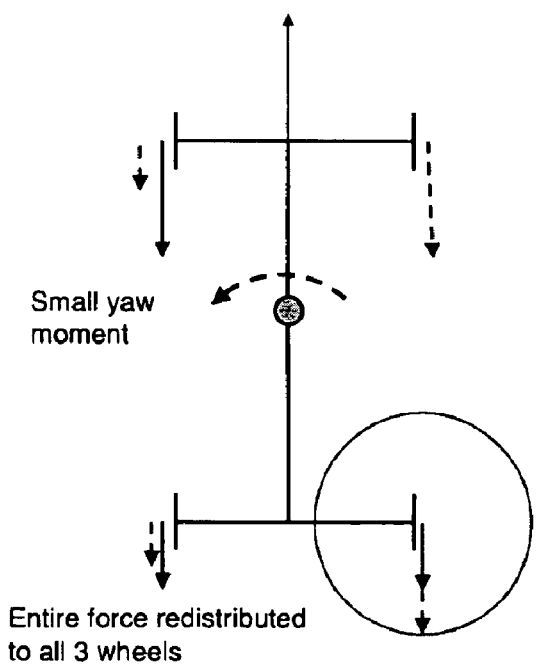
FIG. 6 illustrates redistribution of brake forces during moderate braking with right front brake failure.

Example #2A—moderate braking, as illustrated in FIG. 6. In this instance, the brake force lost, $\Delta F_{xlost}$, is larger than the brake force reserve, $F_{xres}$, but only by a relatively small amount. Part of the brake force lost may be applied as an incremental portion of a first command brake force to the wheel on the same side of vehicle (up to the maximum force for that wheel), while the remainder may be applied as parts of second and third command brake forces to the remaining two opposing side wheels in the same proportion as the tire normal forces. The total brake force (and vehicle deceleration) is maintained, but a small yaw moment is generated due to difference in braking forces side to side. This yaw moment, however, is small enough whereby the vehicle operator may easily cope by providing a small steering correction when necessary.

Figure 7:
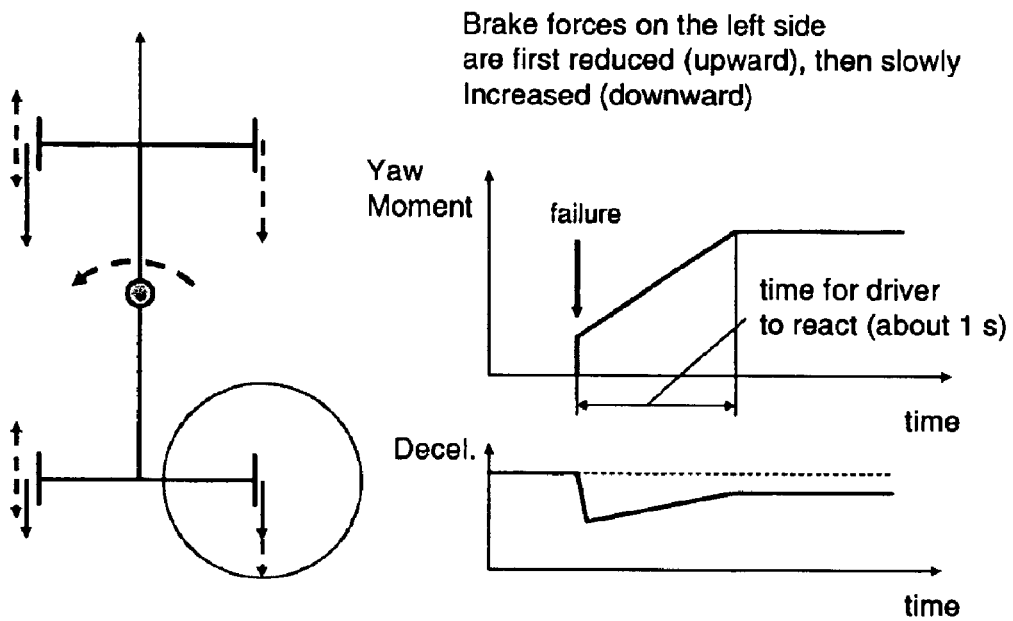
FIG. 7 illustrates redistribution of brake forces during heavy braking with right front brake failure.

Example #3A—heavy braking, as illustrated in FIG. 7. In this instance, the brake force lost, $\Delta F_{xlost}$, is much larger than the brake force reserve, $F_{xres}$. As in example #2A, a part of the brake force lost may be applied as a part of first command brake force to the wheel on the same side of vehicle (up to the maximum force for that wheel). Second and third command brake forces on the opposing side of the vehicle may be initially reduced, and then slowly increased until the total desired brake force is achieved or the brake forces are saturated, whichever condition is achieved first. In this case, the total brake force (and vehicle deceleration) may be first reduced, then increased, as illustrated in the FIG. 7. The initial yaw moment may be kept below a predetermined value (e.g., at or below the level that can be handled by the vehicle operator) and then slowly increased. This allows the vehicle operator sufficient time to react by counter-steering.

For a vehicle equipped with both SBW and BBW systems, the following three braking examples are provided:

Example #1B—light braking, as illustrated in FIG. 5. This instance is analogous to example #1A. No steering correction is necessary and none is applied.

Figure 8:
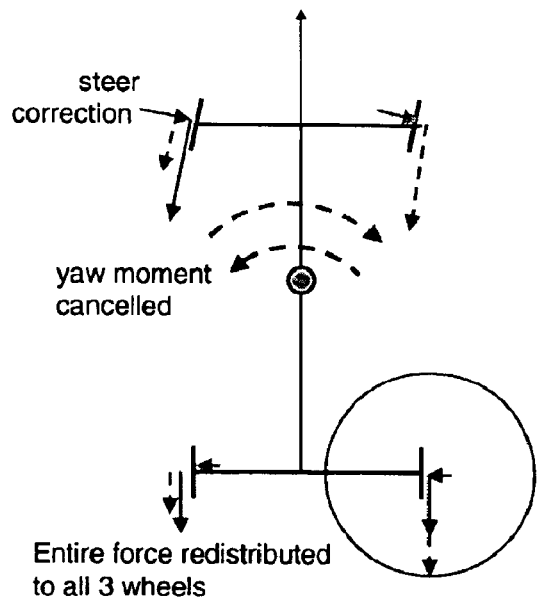
FIG. 8 illustrates redistribution of brake forces and steering correction with moderate braking during right front brake failure.

Example #2B—moderate braking, as illustrated in FIG. 8. In this instance, the brake force lost, $\Delta F_{xlost}$, is larger than the brake force reserve, $F_{xres}$, and the yaw moment generated by non-symmetric braking may be fully compensated by steering correction. Part of the brake force lost may be applied as a part of first command brake force to the wheel on the same side of vehicle (up to the maximum force for that wheel), while the remainder may be applied as parts of second and third command brake forces to the remaining two opposing side wheels in the same proportion as the tire normal forces. Concurrently, a steering correction may be applied to compensate for the yaw moment that results from braking. The total brake force (and vehicle deceleration) may be maintained, and the yaw moment generated due to non-symmetric braking may be fully compensated for by steering.

Figure 9:
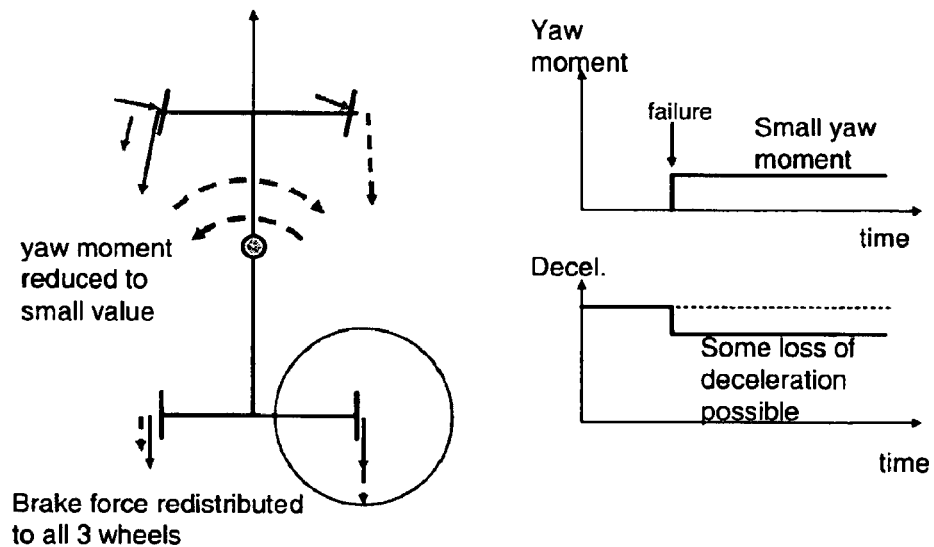
FIG. 9 illustrates redistribution of brake forces and steering correction with heavy braking during right front brake failure.

Example #3B—heavy braking, as illustrated in FIG. 9. In this instance, the brake force lost, $\Delta F_{xlost}$, is much larger than the brake force reserve, $F_{xres}$, and the yaw moment due to braking cannot be fully compensated by steering. As in example #2B, a part of the brake force lost may be applied as a part of first command brake force to the wheel on the same side of vehicle (i.e., up to the maximum force for that wheel). Second and third command brake forces on the opposing side of the vehicle may be increased, but only to the level that results in a yaw moment that is only slightly larger than the moment that can be compensated by steering. The maximum allowable steering angle may be applied to reduce the yaw moment. The yaw moment may be reduced to a small value, but some loss of total brake force (and vehicle deceleration) is possible, depending on how heavy the braking is (relative to surface limit).

Referring again to FIGS. 2A and 2B, the brake control algorithms are now described wherein the first seven steps (steps 101a/b–107a/b) are analogous for vehicles equipped with either BBW or BBW and SBW. The algorithms may begin by determining tire force distribution among all four wheels (steps 101a, 101b). The normal tire forces may be calculated using quasi-static equations incorporating the static loads and the effects of load transfer due to braking and cornering. These equations may be expressed as:

$$N_{LF}=M*b*g/(2*L)-M*h*a_x/(2*L)+\kappa_f*M*h*a_y/t_w \quad (1a)$$

$$N_{RF}=M*b*g/(2*L)-M*h*a_x/(2*L)-\kappa_f*M*h*a_y/t_w \quad (1b)$$

$$N_{LR}=M*a*g/(2*L)+M*h*a_x/(2*L)+\kappa_r*M*h*a_y/t_w \quad (1c)$$

$$N_{LF}=M*a*g/(2*L)+M*h*a_x/(2*L)-\kappa_r*M*h*a_y/t_w \quad (1d)$$

where $N_{ij}$ denotes normal tire forces (i.e., for left front (LF), right front (RF), left rear (LR), and right rear (RR) tires); M is the total mass of vehicle, a and b are distances of vehicle center of gravity to the front and rear axle, respectively; h is height of vehicle center of gravity above ground; L=a+b is vehicle wheelbase, $\kappa_f$ and $\kappa_r=1-\kappa_f$ are the ratios of the roll stiffness of front and rear suspension to the total roll stiffness; and $t_w$ is track width. The signs of longitudinal and lateral accelerations, $a_x$ and $a_y$, in equation (1a–d) correspond to the Society of Automotive Engineer (SAE) convention wherein (forward) acceleration is positive and lateral acceleration in a right turn is positive.

Nominal desired brake force distribution (corresponding to normal operation of braking system without failures) may be determined (steps 102a, 102b). Desired vehicle deceleration, $a_{xdes}$, may be first calculated based on measured brake pedal force or brake pedal travel in a manner known to those skilled in art. For example, the desired longitudinal deceleration may be related to brake pedal force via a look up table. The desired total brake force may then be computed as:

$$F_{xdestot}=M*a_{xdes} \quad (2)$$

The nominal brake force distribution may vary between the symmetric brake force distribution with respect to the longitudinal axis of the vehicle and a distribution of braking forces proportional to the normal tire forces. The desired brake force distribution may therefore be represented as a linear combination of the two described above. A weighting parameter, $0\leq w\leq 1$, may be introduced, which is in essence a side-to-side brake force distribution ratio. The desired brake force for the left front wheel may be expressed as:

$$F_{xdesLF}=(1-w)*F_{xdesLF}^1+w*F_{xdesLF}^2 \quad (3)$$

wherein $F_{xdesLF}^1$ represents the desired brake force corresponding to symmetric brake force distribution and $F_{xdesLF}^2$ to the distribution proportional to normal loads. Similar equations may be applied to the remaining wheels. Note that when w=0, desired brake force distribution is symmetric, as most commonly used today. When w=1, desired brake force distribution is proportional to normal loads, and when 0<w<1, it falls between the two. Thus, equation (3) describes a variety of brake force distributions.

In a symmetric brake force distribution, the brake forces are proportional to the normal forces per axle and are equal on both wheels of the same axle. This yields:

$$F_{xdesLF}^1=M*a_{xdes}*(N_{LF}+N_{RF})/(2*\Sigma N)=M*a_{xdes}*(b+h*a_{xdes}/g)/(2*L) \quad (4)$$

wherein the equation may be analogously expressed for the remaining wheels. Here, $N_{LF}+N_{RF}$ is the normal force for the front axle under the desired deceleration (that is, $N_{LF}$ and $N_{RF}$ are computed from equations (1a) and (1b) with $a_x$ replaced by $-a_{xdes}$); $\Sigma N=M*g$ is the total normal force; g is gravitational acceleration. Note that the desired force in this case, $F_{xdesLF}^1$, does not depend on the lateral acceleration. Thus, equation (4) may be utilized when lateral acceleration measurement is not available.

In the case when the desired brake forces are proportional to normal loads, the desired brake force for the left front wheel may be expressed as:

$$F_{xdesLF}^2=M*a_{xdes}*N_{LF}/(\Sigma N)=M*a_{xdes}*[(b+h*a_{xdes}/g)/(2*L)+\kappa_f*h*a_y/(g*t_w)] \quad (5)$$

Analogous equations may be written for the remaining forces. Note that the desired braking forces given by equations (4) and (5) are identical when the vehicle is not cornering ($a_y$=0).

The magnitude of brake force lost, $\Delta F_{xlost}$, due to failure of one of brake actuators may be determined (steps 103a, 103b). The brake force lost may simply be equal to the desired brake force for the wheel with failed actuator. It may represent the deficit in braking force caused by actuator failure, which needs to be redistributed to other wheels if the total desired brake force is to be maintained.

The brake force limit at each wheel may be determined (steps 104a, 104b). The brake force limit for each wheel is the maximum longitudinal force that may be developed at each tire without exceeding the force limit due to friction. These forces may be expressed as:

$$F_{xLFlim}=\mu_{est}*N_{LF} \quad (6)$$

wherein $N_{LF}$ is the normal force determined in the prior step (steps 101a, 101b) and $\mu_{est}$ is the estimated surface coefficient of adhesion, which may be determined primarily from measured longitudinal and lateral accelerations as known to skilled in art. Analogous equations may be written for the remaining wheels. When the limit of braking force is reached (e.g., at ABS entry threshold), the limit force may also be determined from estimated brake torque.

Brake force reserve may be determined at the wheel on the same side of vehicle as the wheel with the failed actuator (steps 105a, 105b). The brake force reserve is defined as the difference between the limit force (steps 104a, 104b) and the desired brake force (steps 102a, 102b). For example, if the right front brake actuator failed, then the force reserve for the right rear wheel may be calculated as:

$$F_{xRRres}=F_{xRRlim}-F_{xRRdes} \quad (7)$$

If the desired brake force for the identified wheel (IW) is larger than the limit force, then the force reserve is equal to zero.

It may then be verified whether the brake force lost due to failure of brake actuator is less than or about equal to the force reserve on the wheel on the same side of vehicle as the wheel with failed actuator (steps 106a, 106b; i.e., is $\Delta F_{xlost}\leq F_{xres}$?). If the brake force lost is less than or about equal to the force reserve, then $\Delta F_{xlost}$ may be added to the desired brake force of that wheel to equal the command brake force (steps 107a, 107b). The command brake force may be applied and then the algorithm may exit. If the brake force lost is greater than the force reserve, the algorithm may proceed to the next step (steps 108a, 108b).

From this point, the control algorithms may differ for vehicles with BBW system only and for vehicles with both BBW and SBW systems. In the former case, the algorithm may include the following steps:

It may be verified whether the brake force lost is less than or equal to the brake force reserve plus a force threshold (step 108a; i.e., is $\Delta F_{xlost} \leq F_{xres} + \Delta F_{thresh}$?). If the brake force lost is greater than the brake force reserve plus a force threshold, the algorithm may proceed to the next step (step 110a). If, however, it is less than or about equal to, then the command braking forces may be determined as follows (step 109a): first, the command brake force may be increased on the wheel that is at the same side as the one with failed actuator to the limit force; second, the command braking forces applied to the wheels on the other side of vehicle may be increased by the amount of brake force lost minus the brake force reserve in proportion to the desired force on these wheels. The algorithm may then exit.

For example, if the right front brake actuator failed, then the brake force lost may equal the desired brake force of that wheel, that is, $\Delta F_{xlost} = F_{xdesRF}$; the brake reserve may be calculated for the right rear wheel, as in equation (7): $F_{xres} = F_{xRRlim} - F_{xdesRR}$. When $\Delta F_{xlost} \leq F_{xres} + \Delta F_{thresh}$. The command brake forces for the three wheels with operating actuators may be expressed as:

$$F_{xdesRR}' = F_{xdesRR} + F_{xres} \quad (8a)$$

$$F_{xdesLF}' = F_{xdesLF} + (\Delta F_{xlost} - F_{xres}) * F_{xdesLF}/(F_{xdesLF} + F_{xdesLR}) \quad (8b)$$

$$F_{xdesLR}' = F_{xdesLR} + (\Delta F_{xlost} - F_{xres}) * F_{xdesLR}/(F_{xdesLF} + F_{xdesLR}) \quad (8c)$$

The total desired braking force lost due to failure of one actuator (e.g., the right front) may be reassigned to the remaining actuator(s) as parts of one or more command brake forces. However, a side-to-side imbalance in the brake forces of $\Delta F_{thresh}$ (and in the yaw moment of $\Delta F_{thresh} * t_w/2$) may be permitted. For this reason, the magnitude of brake force threshold, $\Delta F_{thresh}$, is preferably set small enough so that the imbalance may easily be handled by the vehicle operator.

When the brake force lost is greater than the reserve force plus threshold, $\Delta F_{xlost} > F_{xres} + \Delta F_{thresh}$, the side-to-side brake force imbalance cannot be reduced to the manageable level by merely increasing the command brake force on the wheel that is on the same side of vehicle as the one with failed actuator. Therefore, the following actions may be taken (step 110a): first, the command brake force on the wheel that is on the side of vehicle with failed actuator may be increased up to the limit; second, the command brake forces on the remaining two wheels (i.e., on the other side of vehicle) may be initially reduced in proportion to the nominal desired brake forces to manageable levels that limit the entire side-to-side brake force imbalance to the threshold value, $\Delta F_{thresh}$. Subsequently, the command brake forces on that side may be increased slowly to the greater desired values, which represent the nominal desired values plus the difference between the brake force lost and reserve brake force. The additional corrective forces may be distributed between these two wheels in the same proportions as the nominal desired braking forces. The slower increase of brake forces may allow the vehicle operator sufficient time to correct the slow build up of yaw moment through steering correction.

Using the example considered where the right front brake fails, the command brake force for the right rear wheel may be expressed as in equation (8a), that is $F_{xdesRR}' = F_{xdesRR} + F_{xres}$. For each of the left wheels, two values may be computed, low and high, as:

$$F_{xdesLFlow} = F_{xdesLF} - (\Delta F_{xlost} - F_{xres} - \Delta F_{thresh}) * F_{xdesLF}/(F_{xdesLF} + F_{xdesLR}) \quad (9a)$$

$$F_{xdesLFhigh} = F_{xdesLF} + (\Delta F_{xlost} - F_{xres}) * F_{xdesLF}/(F_{xdesLF} + F_{xdesLR}) \quad (9b)$$

$$F_{xdesLRlow} = F_{xdesLR} - (\Delta F_{xlost} - F_{xres} - \Delta F_{thresh}) * F_{xdesLR}/(F_{xdesLF} + F_{xdesLR}) \quad (9c)$$

$$F_{xdesLRhigh} = F_{xdesLR} + (\Delta F_{xlost} - F_{xres}) * F_{xdesLR}/(F_{xdesLF} + F_{xdesLR}) \quad (9d)$$

Immediately after the failure is detected, the low values may be applied as command brake forces for both wheels. Then the command brake forces may be increased to the high values with a predetermined rate of change. The algorithm may then exit.

For vehicles equipped with both BBW and SBW systems, the algorithm may include the following steps:

The command brake force may be increased on the wheel that is at the same side as the one with failed actuator to the limit force (step 108b). In this case, $\Delta F_{xlost} > F_{xres}$, so the brake force lost due to failure cannot be fully compensated by increasing braking of the wheel on the same side. For example, if the right front brake actuator failed, then the brake force lost is equal to the desired brake force of that wheel, that is, $\Delta F_{xlost} = F_{xRFdes}$. The brake force reserve may be calculated for the right rear wheel, as in equation (7): $F_{xRRres} = F_{xRRlim} - F_{xRRdes}$. The command brake force at the right rear wheel may be expressed as:

$$F_{xRRdes}' = F_{xRRdes} + F_{xRRres} = F_{xRRlim} \quad (10)$$

which is equal to the limit force, $F_{xRRlim}$. The command brake forces for the left wheels and the steering angle correction may be determined in the next steps. If the total desired brake force is to be maintained, then the brake force deficit, which needs to be applied to the other two wheels, may equal $\Delta F_{xlost} - F_{xres}$.

It may be determined whether the undesired yaw moment (developed when the entire brake force deficit is applied to the wheels on the opposite side of the wheel with failed actuator) may be compensated by steering correction (step 109b). If steering compensation is possible, then the algorithm may proceed to the next step (step 110b), otherwise skip to step (step 111b).

As $\Delta F_{xlost} > F_{xres}$, and only the force $F_{xres}$ is added to the wheel on the same side as the failed actuator, the brake force deficit may equal $\Delta F_{xlost} - F_{xres}$. If the total desired brake force is to be maintained, the entire force deficit, $\Delta F_{xlost} - F_{xres}$, may be applied to the other side (step 110b). As the command brake force on the side of failed actuator is now reduced by $\Delta F_{xlost} - F_{xres}$, while it is increased on the other side by the same amount, the total undesired yaw moment may be expressed as:

$$M_z = (\Delta F_{xlost} - F_{xres}) * t_w \quad (11)$$

where $t_w$ is track width. The sign of the moment depends on which side of vehicle the failed actuator is. The sign is positive (i.e., clockwise moment) when the failed actuator is on the left side, and negative in the opposite case. The steering angle correction necessary to achieve full yaw moment compensation may be expressed as:

$$\Delta \delta_{fdes} = -(C_f + C_r) * M_z/(C_f * C_r * L) = -(C_f + C_r) * (\Delta F_{xlost} - F_{xres}) * t_w/(C_f * C_r * L) \quad (12)$$

wherein $C_f$ and $C_r$ denote the cornering stiffness coefficients of both tires of front and rear axles, respectively. The total steering angle may equal the sum of the nominal steering angle, $\delta_{fdr}$, resulting from operator steering, and the steering correction, $\Delta\delta_{fdes}$:

$$\delta_{ftot}=\delta_{fdr}+\Delta\delta_{fdes} \quad (13)$$

If the magnitudes of steering correction, $\Delta\delta_{fdes}$, and the total steering angle, $\delta_{ftot}$, remain within allowable limits, then the yaw moment may be entirely compensated by the steering angle. The algorithm may then exit.

If the steering compensation is not possible, then the side-to-side difference in braking forces may be limited to the value that can be compensated; in this case, a steering compensation up to the limit of steering angle may be applied (step 111b). If the steering compensation is possible, the brake force deficit, $\Delta F_{xlost}-F_{xres}$, may be added to the side of vehicle opposite to the side with failed actuator in proportion to the nominal brake force distribution and the steering correction applied (step 110b).

For example, if the right front brake actuator fails, then the brake force lost may equal the desired brake force of that wheel, that is, $\Delta F_{xlost}=F_{xRFdes}$. The brake reserve may be calculated for the right rear wheel according to equation (7): $F_{xres}=F_{xRRlim}-F_{xRRdes}$. The command brake forces for the three wheels with operating actuators may be expressed as:

$$F_{xRRdes}'=F_{xRRdes}+F_{xRRres}=F_{xRRlim} \quad (14a)$$

$$F_{xLFdes}'=F_{xLFdes}+(\Delta F_{xlost}-F_{xres})*F_{xLFdes}/(F_{xLFdes}+F_{xLRdes}) \quad (14b)$$

$$F_{xLRdes}'=F_{xLRdes}+(\Delta F_{xlost}-F_{xres})*F_{xLRdes}/(F_{xLFdes}+F_{xLRdes}) \quad (14c)$$

Concurrently, the steering correction may be calculated according to equation (12) with the yaw moment $M_z=-(\Delta F_{xlost}-F_{xres})*t_w$. The sign is negative, as the moment is counterclockwise in this case. This results in a steering correction to the right (positive) direction to counter vehicle pull to the left side.

The portion of the yaw moment that can be compensated by the steering correction may be determined. The command braking forces on the side of vehicle opposite to the failed actuator may be increased by the amount that will result in the yaw moment equaling a value that can be compensated by steering. The maximum allowable steering correction may be applied.

In this case, the yaw moment generated by braking cannot be fully compensated by steering if the total braking force is to be maintained. Assuming that the magnitude of the front steering angle correction is limited to $\Delta\delta_{fmax}$ and the desired correction, $\Delta\delta_{fdes}$, is larger in magnitude. The maximum magnitude of yaw moment that can be compensated may be expressed as:

$$M_{zmax}=C_f*C_r*L*\Delta\delta_{fmax}/(C_f+C_r) \quad (15)$$

The maximum force that may be added to the side of vehicle without failed actuator may be expressed as:

$$F_{xmax}=2*M_{zmax}/t_w-(\Delta F_{xlost}-F_{xres}) \quad (16)$$

which is smaller in magnitude than $(\Delta F_{xlost}-F_{xres})$. This force may be split between two wheels in proportion to the nominal force distribution.

In the example considered herein, the command brake forces may be expressed as:

$$F_{xRRdes}'F_{xRRdes}+F_{xRRres}=F_{xRRlim} \quad (17a)$$

$$F_{xLFdes}'=F_{xLFdes}+F_{xmax}*F_{xLFdes}/(F_{xLFdes}+F_{xLRdes}) \quad (17b)$$

$$F_{xLRdes}'=F_{xLRdes}+F_{xmax}*F_{xLRdes}/(F_{xLFdes}+F_{xLRdes}) \quad (17c)$$

It should be noted that the algorithm described herein is expressed in terms of brake forces between the tire and road surface. However, the equations may be expressed in terms of brake torques by multiplying the forces by the tire radii, $r_d$. In addition, for the vehicle with both BBW and SBW systems, active control of front steer angle was assumed. Those skilled in the art will recognize that the algorithm may readily be adapted for a vehicle with an active rear steer system, in which case the steering correction is given by equation (12), but with a reversed sign.

Figure 10:
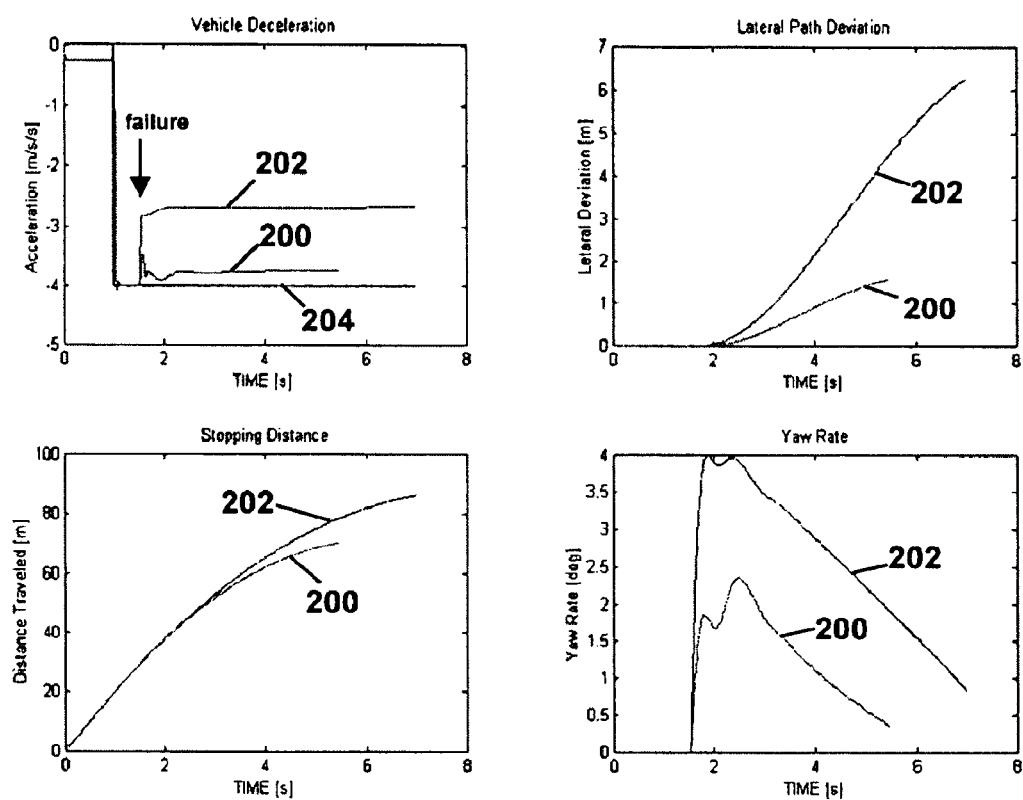
FIG. 10 illustrates vehicle simulation results with and without the application of an algorithm in accordance with the present invention for a straight braking maneuver for a vehicle equipped with brake-by-wire (BBW) wherein the simulation provided left front brake failure without driver steering input.

FIG. 10 illustrates vehicle simulation results with 200 and without 202 the application of an algorithm in accordance with the present invention for a straight braking maneuver for a vehicle equipped with BBW. The simulation provided left front brake failure without driver steering input. The braking maneuver was performed from the initial speed of 20 m/s on a dry surface. In both cases, braking was initiated at 1 s, the left front brake failure occurred at 1.5 s, and the vehicle operator did not provide any steering. With the algorithm applied, the vehicle followed a desired deceleration 204 more closely, reducing the stopping distance significantly. A dramatic reduction was seen in lateral path deviation and vehicle yaw rate when the algorithm was applied.

Figure 11:
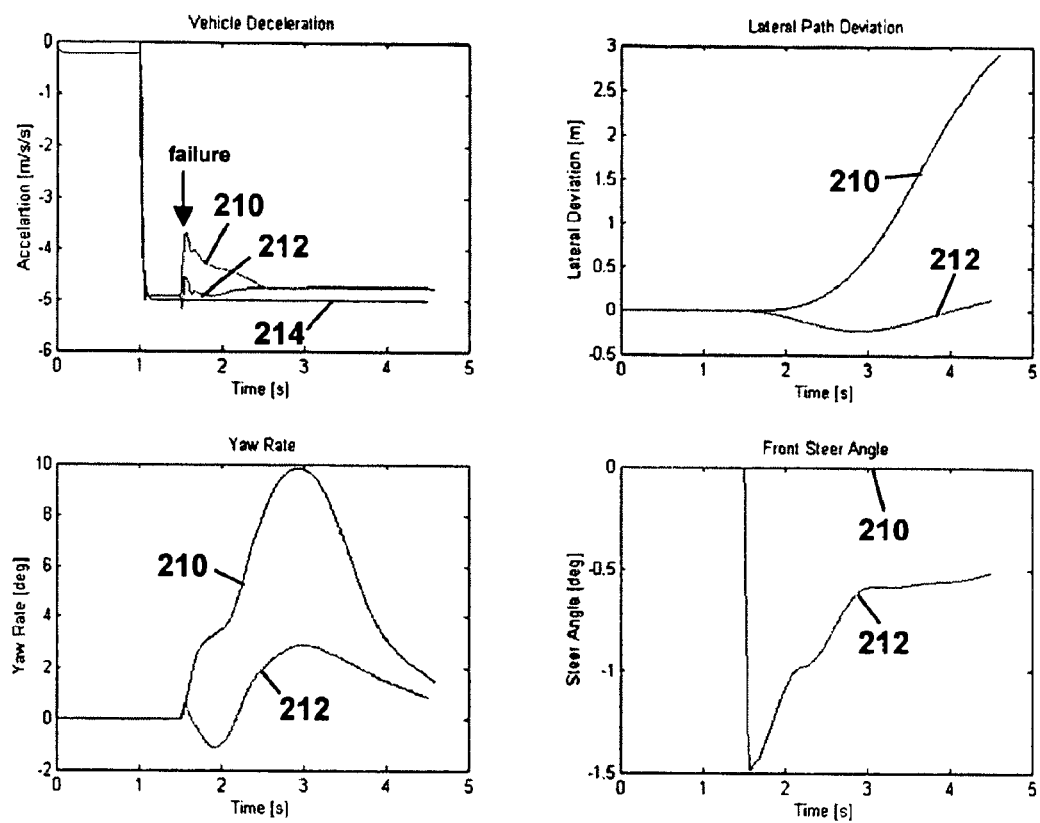
FIG. 11 illustrates vehicle simulation results with the application of an algorithm in accordance with the present invention for a vehicle equipped with BBW versus a comparable vehicle equipped with BBW and steer-by-wire (SBW) wherein the simulation provided left front brake failure without driver steering input.

FIG. 11 illustrates vehicle simulation results with the application of an algorithm in accordance with the present invention for a vehicle equipped with BBW 210 versus a comparable vehicle equipped with BBW and SBW 212. The simulation provided left front brake failure without driver steering input. The braking maneuver was performed from the initial speed of 20 m/s on a dry surface. Braking was initiated at 1 s, the desired deceleration set at about 5 m/s², and the left front wheel actuator failure occurred at 1.5 seconds. With the algorithm turned on, the vehicle equipped with BBW and SBW followed the desired deceleration 214 more closely, especially in the first second of braking thereby significantly reducing the stopping distance. This is because the compensatory steering of the SBW system occurred much faster than could be expected from a typical vehicle operator. A dramatic reduction in the lateral path deviation and vehicle yaw rate was observed for the vehicle equipped with BBW and SBW because the imbalance in the yaw moment was almost completely compensated by steering correction.

While the embodiments of the invention disclosed herein are presently considered to be preferred, various changes and modifications can be made without departing from the spirit and scope of the invention. For example, the vehicle brake system and the method of selectively inhibiting wheel rotation of a vehicle during brake failure are not limited to any particular design, configuration, sequence, or arrangement. The vehicle, sensors, BBW, SBW, brake type, and ECU configuration, size, shape, geometry, location, orientation, number, and function may vary without limiting the utility of the invention. Furthermore, the methods and algorithms according to the present invention may be accomplished by numerous alternative strategies, equations, formula, and the like, and may include additional steps, and vary in step order.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method of selectively inhibiting wheel rotation of a vehicle during brake failure, the method comprising:

determining a brake force lost corresponding to a failed brake;

determining a brake force reserve corresponding to at least one non-failed brake;

determining at least one command brake force based on the brake force lost and the brake force reserve; and applying the at least one command brake force to the at least one non-failed brake wherein at least one of an undesired yaw moment and a yaw moment rate of change are limited to predetermined values.

2. The method of claim 1 wherein determining the brake force reserve comprises determining a limit brake force and a desired brake force.

3. The method of claim 1 wherein the command brake force for a same side non-failed brake is based on the brake force lost when the brake force lost is about equal to or less than the brake force reserve.

4. The method of claim 1 wherein the command brake force for a same side non-failed brake is based on the brake force reserve when the brake force lost is greater than the brake force reserve.

5. The method of claim 4 wherein the command brake force for at least one opposite side non-failed brake is based on the brake force lost and the brake force reserve when the brake force lost is greater than the brake force reserve, and less than or about equal to the brake force reserve added to a threshold value.

6. The method of claim 4 wherein the command brake force for at least one opposite side non-failed brake is based on an initial yaw moment and a total brake force.

7. The method of claim 1 wherein the brake failure comprises a brake actuator failure.

8. The method of claim 1 further comprising:

determining a steering correction to counter a yaw moment generated from asymmetric braking based on a predetermined limit; and applying the steering correction.

9. The method of claim 8 wherein the command brake force for at least one opposite side non-failed brake is based on the brake force lost, the brake force reserve, and a nominal brake force distribution when the steering correction is within the predetermined limit.

10. The method of claim 8 wherein the command brake force for at least one opposite side non-failed brake is based on the yaw moment and a nominal brake force distribution when the steering correction is outside the predetermined limit.

11. A computer usable medium for selectively inhibiting wheel rotation of a vehicle during brake failure, the computer usable medium encoded with a computer program comprising:

computer readable program code for determining a brake force lost corresponding to a failed brake;

computer readable program code for determining a brake force reserve corresponding to at least one non-failed brake;

computer readable program code for determining at least one command brake force based on the brake force lost and the brake force reserve; and computer readable program code for applying the at least one command brake force to the at least one non-failed brake wherein at least one of an undesired yaw moment and a yaw moment rate of change are limited to predetermined values.

12. The computer usable medium of claim 11 wherein the computer readable program code for determining the brake force reserve comprises computer readable program code for determining a limit brake force and a desired brake force.

13. The computer usable medium of claim 11 wherein the command brake force for a same side non-failed brake is based on the brake force lost when the brake force lost is about equal to or less than the brake force reserve.

14. The computer usable medium of claim 11 wherein the command brake force for a same side non-failed brake is based on the brake force reserve when the brake force lost is greater than the brake force reserve.

15. The computer usable medium of claim 14 wherein the command brake force for at least one opposite side non-failed brake is based on the brake force lost and the brake force reserve when the brake force lost is greater than the brake force reserve, and less than or about equal to the brake force reserve added to a threshold value.

16. The computer usable medium of claim 14 wherein the command brake force for at least one opposite side non-failed brake is based on an initial yaw moment and a total brake force.

17. The computer usable medium of claim 11 further comprising:

computer readable program code for determining a steering correction to counter a yaw moment generated from asymmetric braking based on a predetermined limit; and computer readable program code for applying the steering correction.

18. The computer usable medium of claim 17 wherein the command brake force for at least one opposite side non-failed brake is based on the brake force lost, the brake force reserve, and a nominal brake force distribution when the steering correction is within the predetermined limit.

19. The computer usable medium of claim 17 wherein the command brake force for at least one opposite side non-failed brake is based on the yaw moment and a nominal brake force distribution when the steering correction is outside the predetermined limit.

20. A vehicle brake system comprising:

a plurality of brake assemblies for selectively inhibiting wheel rotation of the vehicle wherein a command brake force is applied to at least one non-failed brake; and a controller operably attached to the brake assemblies, the controller comprising;

means for determining a brake force lost corresponding to a failed brake;

means for determining at brake force reserve corresponding to a non-failed brake; and means for determining the command brake force based on the brake force lost and the brake force reserve;

wherein at least one of an undesired yaw moment and a yaw moment rate of change are limited to a predetermined value.

21. The vehicle brake system of claim 20 further comprising an active steer system operably attached to the controller for applying a steering correction.

* * * * *